United States Patent [19]
Smith et al.

[11] Patent Number: 5,809,970
[45] Date of Patent: Sep. 22, 1998

[54] BACKUP CONTROL FOR NATURAL GAS FUELED INTERNAL COMBUSTION ENGINE

[75] Inventors: David H. Smith, Merger Island, Wash.; David E. Bennett, Lake Lillian, Minn.

[73] Assignee: Impco Technologies, Inc., Seattle, Wash.

[21] Appl. No.: 667,466

[22] Filed: Jun. 21, 1996

[51] Int. Cl.$^6$ ................................................. F02B 43/00
[52] U.S. Cl. ................................................. 123/438; 123/529
[58] Field of Search ................................. 123/527, 529, 123/479, 438

[56] References Cited

U.S. PATENT DOCUMENTS

| | | | |
|---|---|---|---|
| 4,537,172 | 8/1985 | Kanehara et al. | 123/527 |
| 4,838,295 | 6/1989 | Smith et al. | 137/9 |
| 4,953,516 | 9/1990 | van der Weide et al. | 123/527 |
| 5,190,012 | 3/1993 | Takahashi | 123/479 |
| 5,353,765 | 10/1994 | Saikalis et al. | 123/438 |
| 5,509,593 | 4/1996 | Leaf et al. | 123/529 |
| 5,549,097 | 8/1996 | Nimberger | 123/529 |

FOREIGN PATENT DOCUMENTS 2935912  3/1981  Germany ................ 123/529

*Primary Examiner*—Erick R. Solis
*Attorney, Agent, or Firm*—Edward A. Sokolski

[57] ABSTRACT

An internal combustion engine is fueled with a controlled mixture of natural gas and air which mixture is regulated by a regulator responsive to an electronic controller. In the event of a system failure with the electronic controller shutting down, a backup regulator automatically bypasses the normal regulator to provide temporary operation with a predetermined acceptable constant gas mixture.

3 Claims, 1 Drawing Sheet

BACKUP CONTROL FOR NATURAL GAS FUELED INTERNAL COMBUSTION ENGINE

BACKGROUND OF THE INVENTION

1. Field of the Invention

This invention relates to internal combustion engines having a system for controlling the gas fuel mixture and more particularly to a backup system for providing temporary operation in the event of control system failure.

2. Description of the Related Art

Control systems are employed to accurately control the mixture of natural gas and air in an internal combustion engine. Such systems generally employ an electronic controller which senses the mass flow rate of the natural gas and that of the air being fed to the engine and generates a control signal which is used to maintain a stoichiometric ratio of air and natural gas. Such a system is described in U.S. Pat. No. 4,838,295 issued Jun. 13, 1989 to Smith, et al. Another such system is described in U.S. Pat. No. 5,353,765 issued Oct. 11, 1994 to Saikalis et al.

In the event of a failure of the control system due to an electrical power outage or a component failure, the engine will be shut down which is highly inconvenient and can be costly. It therefore is highly desirable to have a backup system to enable continued operation in the event of such a failure. In U.S. Pat. No. 5,190,012 to Takahashi, a liquid fuel internal combustion engine is described in which in the event of a failure of the air flow control system, the fuel injection is controlled to reduce the error in the fuel-air ratio caused by such failure. This backup system can only operate if there is electrical power available to operate such system. No backup system has been found in the prior art which operates in the event of a power failure and also covers system electronic component failures.

BRIEF SUMMARY OF THE INVENTION

The present invention provides a backup fuel control in the event of the failure of the electrical control system normally used for controlling the fuel supplied to the engine. This backup control while not providing the optimum fuel mixture of the normal control system enables continued safe engine operation on a temporary basis until the necessary repairs can be effected.

The present invention is used to provide a backup for a fuel control system such as described in the aforementioned U.S. Pat. No. 4,838,295, the disclosure of which is incorporated herein by reference. This system operates to control the mass flow rate of natural gas fuel and the mass flow rate of air to an internal combustion engine controller to provide an optimum stoichiometric ratio of air to natural gas. This end result is achieved by employing an air mass sensor and a gas mass sensor to generate electrical signals in accordance with the flow rate of air and gas to the gas mixer, respectively, comparing these signals in an electronic control unit and generating a control signal in such unit for maintaining the ratio between the two flow rates at a predetermined value.

The present invention includes an auxiliary backup gas flow regulator which is paralleled with the main regulator. In the event of a system failure, an electrically controlled valve is actuated to cut off the supply of gas to the main regulator. The auxiliary regulator is designed to operate at essentially zero pressure which type of operation is typical in mechanical venturi carburetion systems. Temporary operation of the engine is thus provided in a less than optimum but acceptable manner until the malfunction can be remedied and the system restored to normal operation.

It is therefore an object of this invention to enable backup operation of an internal engine in the event of control system failure;

Other objects of the invention will become apparent in connection with the following description in conjunction with the accompanying drawings.

BRIEF DESCRIPTION OF THE DRAWINGS

The sole FIGURE is a schematic drawing of a preferred embodiment of the invention.

DETAILED DESCRIPTION OF THE INVENTION

Figure 1:
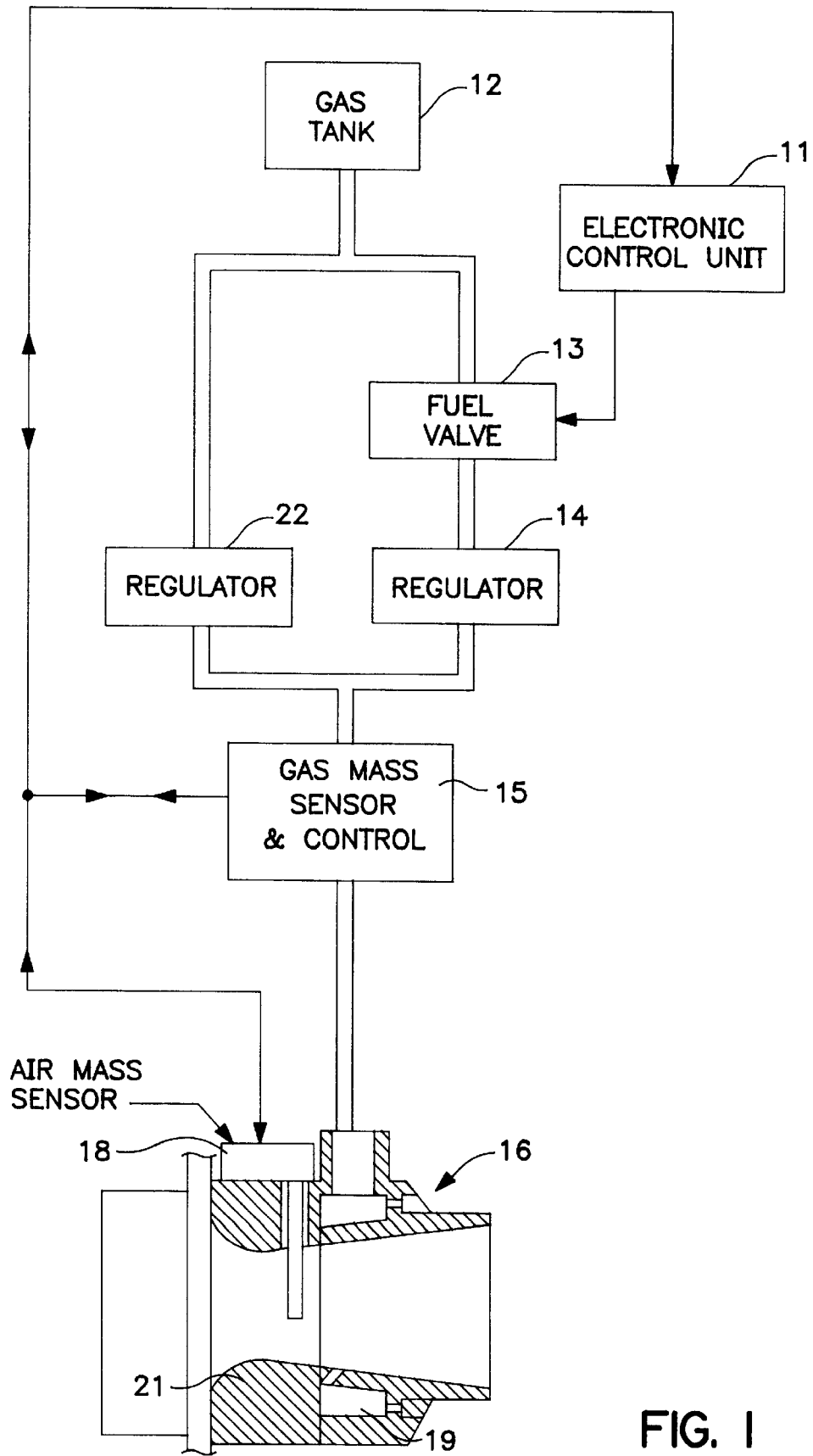

Referring to the sole FIGURE, a preferred embodiment of the invention is shown.

The basic system may be that described in U.S. Pat. No. 4,838,295, issued Jun. 13, 1989 to Smith et al. which is incorporated herein by reference. The present invention is directed towards a modification of that system which enables backup operation in the event of a power failure or system breakdown.

Referring to the FIGURE, in normal operation of the system, as described in U.S. Pat. No. 4,838,295, natural gas fuel is fed from tank 12 through valve 13 to fuel regulator 14 which is set to feed gas at a predetermined pressure (typically 2" of water). Valve 13 is normally closed and is driven to its "open" state by a control signal from electronic control unit 11. The output of regulator 14 is fed to gas mass sensor and control 15 from which the fuel is fed to gas mixer 16. The gas is injected through gas distribution ring 19 situated near the vena contracta of venturi 21. The partial vacuum in this location effected by the venturi action does not normally meter the gas flow completely, but is only used to propel the gas into the air/gas mixing area in the divergent section of the venturi.

Air mass sensor and control 18 and gas mass sensor and control 15 operate in response to electronic control 11 to maintain the air and gas mass flow rates at a desired ratio, as described in U.S. Pat. No. 4,838,295.

In the event of a control system failure which may be due to a power failure or other malfunction, power is removed from sensor and control 15 as well as valve 13. When power is removed from valve 13, it goes to its normally closed position and shuts off gas flow to regulator 14. With power removed from sensor and control 15, it goes to its wide open position. Regulator 21 is set to supply fuel at essentially zero pressure which is usual practice for mechanical venturi systems as it provides an approximately constant air to fuel ratio over a wide engine flow range. It is to be noted that during normal operation, regulator 22 has no effect on the system in view of the fact that it is set below the normal regulator output. Typically, regulator 14 operates at a pressure of about two inches of water while regulator 22 operates at about zero inches of water. Regulator 14 therefore fully takes over the operation.

Thus, in the event of control system failure, a backup operation is provided through regulator 21 which while not providing optimum operation nevertheless provides adequate and safe operation of the engine until repairs can be effected.

While the invention has been described and illustrated in detail, it is to be clearly understood that this is intended by way of illustration and example only and is not to be taken by way of limitation, the scope of the invention being limited only by the terms of the following claims.

We claim:

1. In a system for managing the flow of natural gas fuel from a supply of said fuel to an engine including a first regulator for controlling the flow of gas to said engine and an electronic control system for controlling said first regulator to maintain a predetermined air/fuel ratio, a backup system for operating said engine in the event of a failure of the electronic control system or of the power supply comprising:

a second regulator connected in parallel with said first regulator, said second regulator being adjusted to operate at a lower pressure than said first regulator, a normally closed valve connected between said supply of natural gas and said first regulator, said valve being opened in response to said electronic control system to permit said natural gas to flow to said first regulator, said valve closing to shut off the supply of said gas to said first regulator on failure of said electronic control system or power supply, thereby enabling said second regulator to feed a supply of gas to said engine.

2. The backup system of claim 1 wherein said first regulator is adjusted to operate at a pressure of about two inches of water and said second regulator is adjusted to operate at a pressure of about zero inches of water.

3. A system for controlling the supply of a mixture of natural gas and air to the gas mixer of an internal combustion engine comprising:

a supply of natural gas, an electronic controller, a first pressure regulator connected to said supply of natural gas to receive gas therefrom, a gas mass sensor and control connected to said first pressure regulator to receive natural gas therefrom, said gas mass sensor and control having an electrical output signal in accordance with the flow of gas therethrough, said electrical output signal being fed to said electronic controller, an air mass sensor for generating an electrical signal in accordance with the flow of air to said gas mixer, said electronic controller generating an electronic control signal which is fed to said gas mass sensor and control to maintain the ratio of gas to air at a predetermined constant value, a second pressure regulator connected in parallel with said first pressure regulator, said first pressure regulator being set to operate at a higher pressure than said second pressure regulator, and a control valve connected between the supply of natural gas and said first pressure regulator, said control valve being responsively connected to said electronic controller, and being actuated by said electronic controller to shut off the supply of gas to said first regulator and said air mass sensor and control being actuated by said controller to the fully open position in the event of a system failure, thereby providing gas to the gas mixer solely through said second pressure regulator.

* * * * *